(12) United States Patent
VanRisseghem

(10) Patent No.: US 6,536,155 B1
(45) Date of Patent: Mar. 25, 2003

(54) FISHING LURE

(76) Inventor: Joel VanRisseghem, 4500 Brunswick Ave. N., Crystal, MN (US) 55422

( * ) Notice: Subject to any disclaimer, the term of this patent is extended or adjusted under 35 U.S.C. 154(b) by 0 days.

(21) Appl. No.: 09/863,673

(22) Filed: May 23, 2001

(51) Int. Cl.[7] .............................................. A01K 85/10
(52) U.S. Cl. ..................... 43/42.13; 43/42.14; 43/42.24
(58) Field of Search ............................. 43/42.11, 42.13, 43/42.14, 42.19, 42.22, 42.24, 42.35, 42.45; D22/132

(56) References Cited

U.S. PATENT DOCUMENTS

| | | | | |
|---|---|---|---|---|
| 326,886 A | * | 9/1885 | Robinson | 43/42.24 |
| 885,861 A | * | 4/1908 | Pepper | 43/42.14 |
| 1,836,651 A | * | 12/1931 | Davenport | 43/42.24 |
| 2,167,945 A | * | 8/1939 | Gilliam | 43/42.13 |
| D138,496 S | * | 8/1944 | Hatcher | D22/132 |
| 2,556,507 A | * | 6/1951 | Tallaksen | 43/42.45 |
| 2,567,787 A | * | 9/1951 | Sahutski | 43/42.13 |
| 4,227,332 A | * | 10/1980 | Crofoot et al. | 43/42.25 |
| 4,232,469 A | * | 11/1980 | Shiverdecker | D22/132 |
| 4,414,772 A | * | 11/1983 | Duncan | 43/42.45 |
| 4,435,914 A | * | 3/1984 | Norman | 43/42.19 |
| 4,744,168 A | * | 5/1988 | McClellan | 43/42.24 |
| 4,793,089 A | * | 12/1988 | Long et al. | 43/42.13 |
| 4,823,501 A | * | 4/1989 | Standish, Jr. | 43/42.13 |
| 5,138,789 A | * | 8/1992 | Hood | 43/42.13 |
| 5,537,770 A | * | 7/1996 | Storm et al. | 43/42.22 |
| 5,911,570 A | * | 6/1999 | Freitas et al. | 43/42.13 |
| 5,987,805 A | * | 11/1999 | Laney | 43/42.13 |

FOREIGN PATENT DOCUMENTS

JP        11-46629 B1  *  2/1999

* cited by examiner

*Primary Examiner*—Darren W. Ark
(74) *Attorney, Agent, or Firm*—Law Offices of John Chupa and Associates, P.C.

(57) ABSTRACT

A fishing lure 10 which accurately simulates the form and motion of an aquatic rodent. Fishing lure 10 includes a generally elongated body portion 12, four extending members 14, 16, 18 and 20 which project from body portion 12, four spinning or turbulence-generating assemblies 22, 24, 26 and 28 which are respectively attached to members 14, 16, 18 and 20, a pair of hooks 30, 32, and a flexible tail member 34. When lure 10 is moved through the water, assemblies 22–28 simulate the swimming motions of an aquatic rodent.

3 Claims, 1 Drawing Sheet

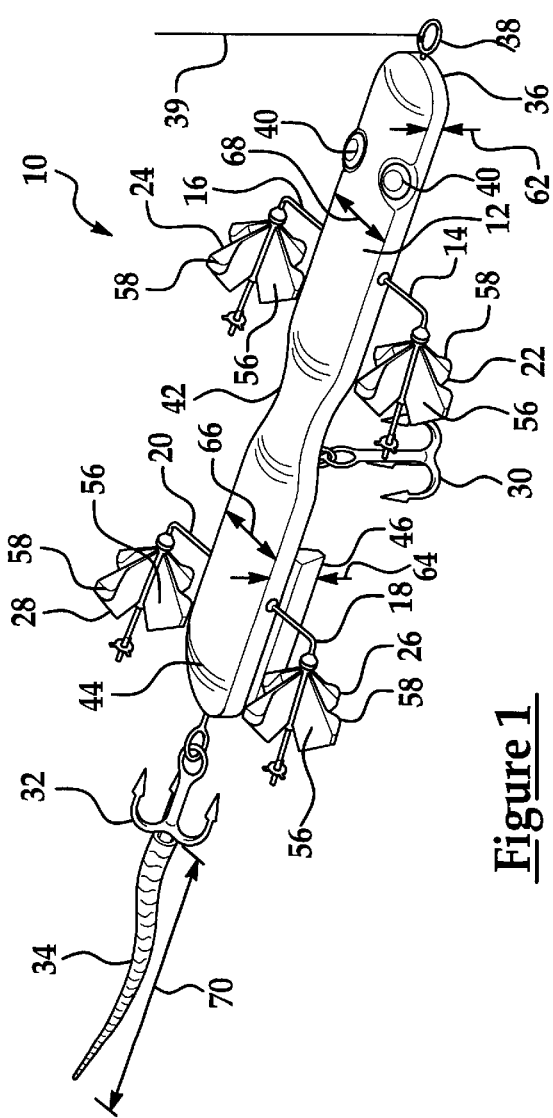
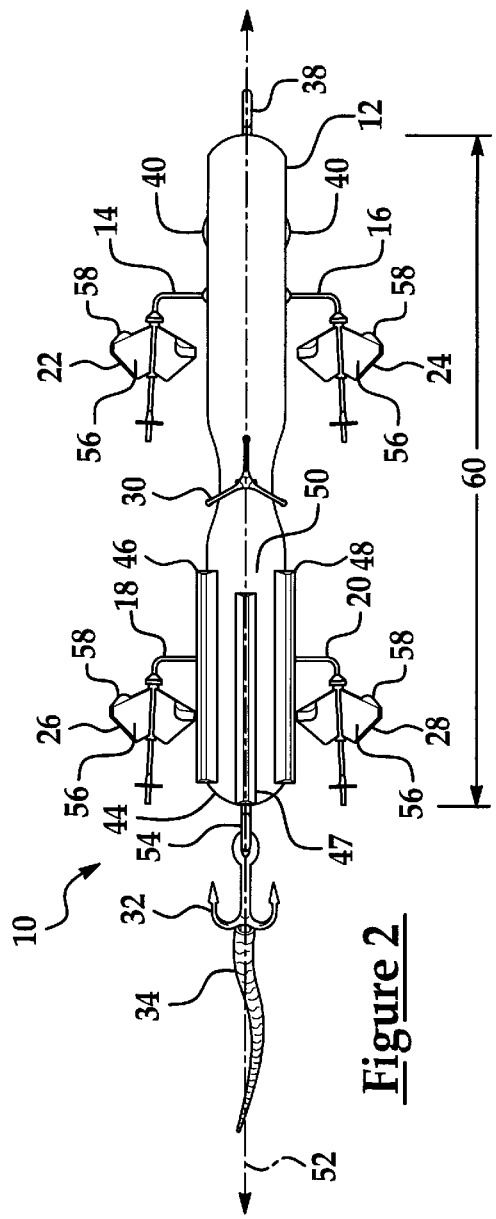

FISHING LURE

FIELD OF THE INVENTION

This invention relates to a fishing lure, and more particularly to a fishing lure which accurately simulates the form and movements of an aquatic rodent, such as a muskrat.

BACKGROUND

Fisherman commonly use artificial fishing lures to attract and capture fish. Fishing lures typically comprise a plastic or wooden body designed to simulate the appearance and movement of a fish, worm or an insect, and one or more hooks (e.g., treble hooks) which are attached to the body. The lure is attached to a fishing line and is moved through the water in an attempt to attract fish that perceive the lure to be an edible fish, worm or insect. When a fish attempts to eat or bite the lure, it is typically ensnared by one or more of the attached hooks.

While these prior lures are effective to attract and catch many fish, they may be ineffective with certain fish that are more prone to feed on other types of creatures, such as aquatic type rodents or mammals (e.g., muskrats or other types of aquatic rodents). For example and without limitation, in many areas and/or bodies of water and/or during certain times of the year, relatively large game fish (e.g., muskellunge, pike, and bass) often feed on small to mid-size aquatic rodents (e.g., muskrats). Conventional fishing lures are not adapted to accurately simulate the shape or movement of such aquatic rodents, and therefore, may be ineffective to catch certain relatively large game fish.

There is therefore a need to provide a fishing lure which overcomes the various previously delineated drawbacks of the prior art and which effectively simulates the shape and movement of an aquatic rodent such as a muskrat.

SUMMARY OF THE INVENTION

A first non-limiting advantage of the present invention is that it provides a fishing lure which accurately simulates the shape and movement of an aquatic rodent.

A second non-limiting embodiment of the present invention is that it provides a fishing lure which simulates an aquatic rodent and which utilizes a durable buoyancy mechanism for ensuring that the lure remains substantially at the surface of the water.

A third non-limiting embodiment of the present invention is that it provides a fishing lure which accurately simulates the swimming movements of the forelegs and hind legs of an aquatic rodent.

According to a first aspect of the present invention, a fishing lure is provided and includes a body portion which simulates the form of an aquatic rodent; a tail portion which is coupled to said body portion; at least one turbulence generating member which is coupled to said body portion and which is effective to simulate motion of said aquatic rodent; and at least one hook member.

According to a second aspect of the present invention, a fishing lure is provided and includes a generally elongated body portion having the form of an aquatic rodent; a plurality of extending members which substantially orthogonally project from said body portion; a plurality of turbulence generating members which are each coupled to a unique one of said plurality of extending members and which are effective to simulate motion of said aquatic rodent; and at least one hook member which is coupled to said body portion.

These and other objects, aspects, features, and advantages of the present invention will become apparent from a consideration of the following specification and the attached drawings.

BRIEF DESCRIPTION OF THE DRAWINGS

FIG. 1 is a perspective view of a fishing lure made in accordance with the teachings of the preferred embodiment of the invention.

FIG. 2 is a bottom view of the fishing lure shown in FIG. 1.

DETAILED DESCRIPTION OF THE PREFERRED EMBODIMENT OF THE INVENTION

Referring now to FIGS. 1 and 2, there is shown a fishing lure 10 which is made in accordance with the teachings of the preferred embodiment of the invention. As shown, lure 10 includes a generally elongated body portion 12, four extending members 14, 16, 18 and 20 which project from body portion 12, four spinning or turbulence-generating assemblies 22, 24, 26 and 28 which are respectively attached to members 14, 16, 18 and 20, a pair of hooks 30, 32, and a flexible tail member 34.

In the preferred embodiment of the invention, body member 12 is generally elongated and has the general form of an aquatic rodent. Body 12 includes a rounded front end portion 36 including a ring 38 which is fixedly attached to member 12 and which is effective to receive a portion of a fishing leader or line 39, thereby allowing the lure 10 to be attached to a fishing apparatus (e.g., a fishing rod). Front end portion 36 further includes a pair of substantially identical bulbous protuberances 40, which are formed on the top surface of the body 12 and which simulate the eyes of the aquatic rodent which is simulated by lure 10. Body 12 further includes a narrowed or tapered middle portion 42, and a rear end portion 44. End portion 44 includes three buoyant members 46, 47, 48 which are fixedly attached to the bottom surface 50 of body 12. Buoyant members 46, 48 are disposed on opposing outside portions of surface 50, and member 47 is disposed between members 46, 48 and lies generally along the longitudinal axis of symmetry 52 of body 12. Members 46–48 are each generally elongated and have generally triangular shaped cross-sections which assist in guiding lure 10 through the water. Particularly, the bottoms of members 46–48 pass through the water and serve as "fins" which cause member 10 to travel in a relatively straight line or path. In the preferred embodiment, members 46–48 are manufactured from a material less dense than water, and prevent the lure 10 from sinking or plunging below the surface of the water. In the preferred embodiment, members 46–48 are manufactured from wood and include a plastic coating which prevents the members 46–48 from absorbing water. In one non-limited embodiment, members 46–48 are manufactured from cedar wood and are "shrink-wrapped" with a plastic covering. In such an embodiment, the members 46–48 may be manufactured in a relatively quick and simple manner. The back end portion 44 of body 12 also includes a ring 54 which is fixedly attached to body 12 and which retains hook 32. Body 12 is preferably manufactured from a relatively strong, water-resistant, and durable material such as plastic or a composite material.

Members 14, 16, 18 and 20 are preferably manufactured from a durable metal material. Members 14–20 are fixedly coupled to and substantially orthogonally extend from body 12. In the preferred embodiment, members 14–20 are generally "L"-shaped. Turbulence generating members 22, 24, 26, and 28 are respectively and rotatably attached to the outer ends of members 14, 16, 18 and 20 (e.g., by use of conventional bearing members). Members 22–28 have a "propeller" type shape which causes members 22–28 to rotate when passing through water, thereby generating an amount of turbulence. In the preferred embodiment, each member 22–28 includes four substantially identical blades 56. Each blade 56 includes a bent or curved tip or edge 58, which causes the members 22–28 to rotate when passing through water. In alternate embodiments, members 22–28 may be of any other suitable shape or construction which generates a desired amount of turbulence when passing through water.

Hooks 30, 32 are conventional fishing treble-type hooks. In other alternate embodiments, different types and/or numbers of hooks may be used. Tail 34 is fixedly attached to hook 32 and is preferably made from a resilient material, such as rubber. In other alternate embodiments, tail 34 may be directly coupled to body 12.

The various components of lure 10 may be painted in any desirable color and may be sized in any suitable manner in order to correspond with a particular aquatic rodent or mammal. For example and without limitation, in one non-limiting embodiment, the body portion is a dark brown color, and the following dimensions provide for an accurate simulation of a muskrat: about 8¼" for the length 60 of body 12; about ⅝" for the thickness 62 of head portion 36; about 1" for the total thickness 64 of the rear portion 44 including members 46–48; about 1 5⁄16" for the width 66 of the rear portion 44 of the body 12; about 1 1⁄16" for the width 68 of the front portion 36 of body 12; and about 3½" for the tail 34. These dimensions can be adjusted based on the type of fish which is being sought and/or the types of aquatic rodents resident in a certain area.

In operation, a fisherman or other desiring user securely attaches lure 10 to a fishing apparatus or rod (e.g., by use of a leader). Lure 10 is then cast into the water and is made to pass through the water in a conventional manner, such as by trolling with the lure, or by "reeling in" the lure 10 from a stationary location with a fishing rod. When the lure 10 passes through the water, members 22–28 each begin to spin, thereby generating turbulence at the outermost four corners of the lure 10. This generated turbulence is effective to simulate the turbulence generate by the swimming motions of many aquatic rodents. Particularly, the turbulence generated by members 22–28 is substantially similar to that made by the appendages (e.g., legs) of a swimming aquatic rodent. The turbulence generated by members 22–28 is also effective to cause tail 34 to move from side to side in a "snake-like" manner, thereby causing the lure 10 to further replicate the swimming motions of an aquatic rodent and further attracting the attention of game fish in the area. The buoyant members 46–48 cause the lure 10 to move in a substantially straight line and substantially prevent the lure 10 from plunging downward, thereby keeping the lure 10 substantially on the surface of the water. In this manner, lure 10 accurately simulates the form and movement of an aquatic rodent. Fish that are attracted by the lure 10 and that attempt to bite the lure 10 are ensnared by hooks 30, 32, and may be "reeled in" and captured in a conventional manner.

It is understood that the invention is not limited by the exact construction or method illustrated and described above but that various changes and/or modifications may be made without departing from the spirit and/or the scope of Applicant's inventions.

What is claimed is:

1. A fishing lure comprising:
   a generally elongated body portion having the form of an aquatic rodent;
   a plurality of extending members which substantially orthogonally project from said body portion, wherein said plurality of extending members comprises two opposing pairs of said extending members;
   a plurality of turbulence generating members which are each coupled to a respective one of said plurality of extending members and which are effective to simulate motion of said aquatic rodent, wherein said plurality of turbulence generating members comprises two opposing pairs of said turbulence generating members;
   a resilient tail which is coupled to said body portion;
   three generally elongated buoyant members having generally triangular cross-sections which are coupled to a bottom surface of said body portion; and
   at least one hook member which is coupled to said body portion.

2. The fishing lure of claim 1 wherein said at least one hook member comprises a treble hook.

3. The fishing lure of claim 2 wherein said at least one hook member comprises two treble hooks.

* * * * *